United States Patent
Lee et al.

(10) Patent No.: US 8,072,695 B1
(45) Date of Patent: Dec. 6, 2011

(54) IMAGING LENS

(75) Inventors: Poche Lee, Taichung County (TW); Kuo-Wen Chang, Taichung County (TW); Long-Sheng Liao, Daya Township, Taichung County (TW)

(73) Assignee: Genius Electronic Optical Co., Ltd., Taichung (TW)

( * ) Notice: Subject to any disclaimer, the term of this patent is extended or adjusted under 35 U.S.C. 154(b) by 0 days.

(21) Appl. No.: 12/972,028

(22) Filed: Dec. 17, 2010

(30) Foreign Application Priority Data

Jul. 9, 2010 (TW) .............................. 99122689 A
Nov. 11, 2010 (TW) .............................. 99138833 A

(51) Int. Cl.
*G02B 9/60* (2006.01)
*G02B 13/18* (2006.01)

(52) U.S. Cl. .................... 359/764; 359/714; 359/763

(58) Field of Classification Search .................. 359/764, 359/763, 756, 757, 714, 713, 658, 659, 765, 359/766
See application file for complete search history.

(56) References Cited

U.S. PATENT DOCUMENTS

| 6,476,982 B1 | 11/2002 | Kawakami |
| 7,110,188 B2 | 9/2006 | Matsui et al. |
| 7,443,610 B1 | 10/2008 | Lin et al. |
| 7,453,654 B2 | 11/2008 | Shinohara |
| 7,480,105 B2 | 1/2009 | Mori |
| 7,710,665 B2 | 5/2010 | Park et al. |
| 7,715,118 B2 * | 5/2010 | Kato .......................... 359/754 |
| 2010/0277605 A1 * | 11/2010 | Nozaki et al. .............. 348/208.4 |

* cited by examiner

*Primary Examiner* — Scott J Sugarman
(74) *Attorney, Agent, or Firm* — Dickstein Shapiro LLP

(57) ABSTRACT

An imaging lens includes plastic-made first, second, third, fourth, and fifth lens elements arranged in the given order from an object side to an imaging side, each having object-side and imaging-side surfaces facing toward the object and imaging sides, respectively. The first lens element has a positive focusing power, and the object-side surface thereof is a convex surface. The second lens element has a negative focusing power, and the imaging-side surface thereof is a concave surface. The third lens element has a positive focusing power, and each of the imaging-side and object-side surfaces thereof is a convex surface. The fourth lens element is a meniscus lens, and the imaging-side surface thereof is a convex surface. The imaging-side surface of the fifth lens element has a concave area in a vicinity of an optical axis of the fifth lens element.

9 Claims, 7 Drawing Sheets

IMAGING LENS

CROSS-REFERENCE TO RELATED APPLICATION

This application claims priorities of Taiwanese Application Nos. 099122689 and 099138833, filed on Jul. 9, 2010, and Nov. 11, 2010, respectively.

BACKGROUND OF THE INVENTION

1. Field of the Invention

The present invention relates to an imaging lens and an electronic apparatus having the same, more particularly to an imaging lens with five lens elements and to an electronic apparatus having the same.

2. Description of the Related Art

In recent years, various electronic devices are designed to include imaging lenses and image sensors for image-capturing and video-recording capabilities. To improve portability and imaging performances while reducing dimensions and weights of the electronic devices, different combinations of lenses are installed in the electronic devices.

U.S. Pat. Nos. 6,476,982 and 7,453,654 disclose imaging lenses with four lens elements, which are generally operated at high F numbers (i.e., small apertures) to thereby alleviate impact to image quality by marginal rays that cannot be focused onto the image sensors, which is known as optical vignetting. However, such a technique to improve image quality also reduces the amount of incident light sensed by the image sensors, which in turn reduces signal-to-noise ratios of captured images. Therefore, the aforementioned technique is inappropriate for application to electronic devices with image sensors having relatively small pixel sizes.

U.S. Pat. Nos. 7,480,105, 7,110,188, 7,443,610, and 7,710,665 disclose imaging lenses with five lens elements to alleviate the drawbacks of those with four lenses. Each of the imaging lenses has a unique combination and arrangement of lens elements with different shapes to thereby achieve a specific combination of optical characteristics. However, in achieving the specific combination of optical characteristics, certain aspects of optical performance are compromised. Therefore, the need to develop other imaging lenses with better combinations of optical characteristics still exists in the market.

SUMMARY OF THE INVENTION

Therefore, an object of the present invention is to provide an imaging lens with a desired combination of optical characteristics.

Accordingly, an imaging lens of the present invention includes first, second, third, fourth, and fifth lens elements arranged in the given order from an object side to an imaging side, each of the first, second, third, fourth and fifth lens elements having an object-side surface facing toward the object side, and an imaging-side surface facing toward the imaging side. The first lens element has a positive focusing power, and the object-side surface of the first lens element is a convex surface. The second lens element has a negative focusing power, and the imaging-side surface of the second lens element is a concave surface. The third lens element has a positive focusing power, and each of the imaging-side and object-side surfaces of the third lens element is a convex surface. The fourth lens element is a meniscus lens, and the imaging-side surface of the fourth lens element is a convex surface. The imaging-side surface of the fifth lens element has a concave area in a vicinity of an optical axis of the fifth lens element. Each of the first, second, third, fourth and fifth lens elements is made of plastic. The imaging lens satisfies the optical condition of $|f_2/f|<1$, wherein $f_2$ represents a focal length of the second lens element, and f represents a focal length of the imaging lens.

Another object of the present invention is to provide an electronic apparatus having an imaging module.

Accordingly, an electronic apparatus of the present invention includes a housing and an imaging module that is disposed in the housing. The imaging module includes an imaging lens having an object side and an imaging side, and an image sensor disposed at the imaging side. The imaging lens includes first, second, third, fourth, and fifth lens elements arranged in the given order from the object side to the imaging side, each of the first, second, third, fourth and fifth lens elements having an object-side surface facing toward the object side, and an imaging-side surface facing toward the imaging side.

The first lens element has a positive focusing power, and the object-side surface of the first lens element is a convex surface. The second lens element has a negative focusing power, and the imaging-side surface of the second lens element is a concave surface. The third lens element has a positive focusing power, and each of the imaging-side and object-side surfaces of the third lens element is a convex surface. The fourth lens element is a meniscus lens, and the imaging-side surface of the fourth lens element is a convex surface. The imaging-side surface of the fifth lens element has a concave area in a vicinity of an optical axis of the fifth lens element. Each of the first, second, third, fourth and fifth lens elements is made of plastic. The imaging lens satisfies the optical condition of $|f_2/f|<1$, wherein $f_2$ represents a focal length of the second lens element, and f represents a focal length of the imaging lens.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENTS

Figure 1:
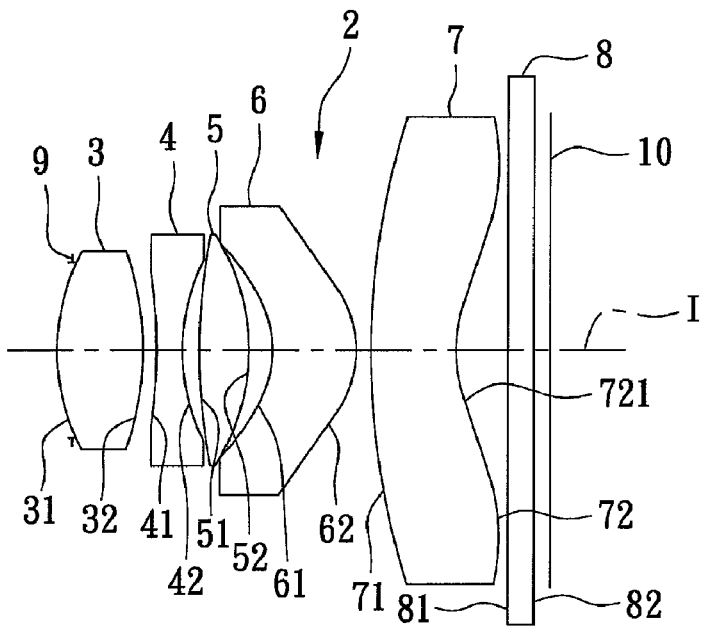
FIG. 1 is a schematic diagram illustrating the first preferred embodiment of an imaging lens according to the present invention.

Before the present invention is described in greater detail, it should be noted that like elements are denoted by the same reference numerals throughout the disclosure.

Referring to FIG. 1, the first preferred embodiment of an imaging lens 2, according to the present invention, includes first, second, third, fourth, and fifth lens elements 3, 4, 5, 6, 7 and an optical filter 8 arranged in the given order from an object side to an imaging side. Each of the first, second, third, fourth, and fifth lens elements 3, 4, 5, 6, 7 is made of plastic, and has an object-side surface 31, 41, 51, 61, 71 facing toward the object side, and an imaging-side surface 32, 42, 52, 62, 72 facing toward the imaging side. The imaging lens 2 further includes an aperture stop 9 that may be disposed at the object-side surface 31 of the first lens element 3 or between the first and second lens elements 3, 4. When light from a target object enters the imaging lens 2, it passes through the aperture stop 9, the lens elements 3-7, and the optical filter 8 in the given order, and forms an image at an imaging plane 10.

In the first preferred embodiment, the aperture stop 9 is disposed at the object-side surface 31 of the first lens element 3. The first lens element 3 has a positive focusing power (i.e., a positive diopter or a positive refracting power), and the object-side and imaging-side surfaces 31, 32 thereof are convex surfaces, respectively. The second lens element 4 has a negative focusing power, and the object-side and imaging-side surfaces 41, 42 thereof are concave surfaces, respectively. The third lens element 5 has a positive focusing power, and the object-side and imaging-side surfaces 51, 52 thereof are convex surfaces, respectively. The second and third lens elements 4, 5 have a gap formed therebetween. The fourth lens element 6 is a meniscus lens having a positive focusing power, and the object-side and imaging-side surfaces 61, 62 thereof are concave and convex surfaces, respectively. The fifth lens element 7 has a negative focusing power, the object-side surface 71 thereof is a convex surface, and the imaging-side surface 72 thereof is a wavelike surface having a concave area 721 that is in a vicinity of an optical axis (I) of the fifth lens element 7. Table 1 shows optical parameters of the lens elements 3-7, the optical filter 8, and the imaging plane 10. It is to be noted that the optical filter 8 also has an object-side surface 81 facing toward the object side, and an imaging-side surface 82 facing toward the imaging side.

TABLE 1

| Surface | | Radius of curvature (mm) | Thickness (mm) | Refractive index | Abbe Number |
|---|---|---|---|---|---|
| Aperture Stop 9 | | ∞ | −0.05 | — | — |
| First lens element 3 | 31 | 2.343 | 1.071 | 1.544 | 56.09 |
| | 32 | −5.855 | 0.170 | | |
| Second lens element 4 | 41 | −406.678 | 0.344 | 1.607 | 27.00 |
| | 42 | 2.158 | 0.219 | | |
| Third lens element 5 | 51 | 8.034 | 0.536 | 1.544 | 56.09 |
| | 52 | −3.525 | 0.364 | | |
| Fourth lens element 6 | 61 | −1.417 | 1.071 | 1.544 | 56.09 |
| | 62 | −1.176 | 0.195 | | |
| Fifth lens element 7 | 71 | 7.332 | 1.071 | 1.530 | 56.00 |
| | 72 | 1.496 | 0.643 | | |
| Optical filter 8 | 81 | ∞ | 0.321 | 1.517 | 64.00 |
| | 82 | ∞ | 0.223 | | |
| Imaging plane 10 | | ∞ | −0.008 | — | — |

The object-side surfaces 31, 41, 61, 71 and the imaging-side surfaces 32, 42, 62, 72 are aspherical surfaces, and may be defined by the following equation (1):

$$Z(X) = \frac{\frac{X^2}{r}}{1 + \sqrt{1 - (1+K)\frac{X^2}{r^2}}} + AX^4 + BX^6 + CX^8 + DX^{10} + EX^{12} \tag{1}$$

wherein (Z) represents an axis extending along the optical axis (I), (X) represents an axis extending perpendicular to the optical axis (I), and (r) is the radius of curvature (see Table 1). Moreover, Tables 2 and 3 show conic constants (K), and higher-order aspherical surface coefficients (A), (B), (C), (D), (E) of each of the object-side surfaces 31, 41, 61, 71 and the imaging-side surfaces 32, 42, 62, 72.

TABLE 2

| Surface | K | A | B |
|---|---|---|---|
| 31 | −9.9444E+00 | 9.2990E−02 | −5.6674E−02 |
| 32 | −1.7094E+01 | 3.9803E−02 | −7.7497E−02 |
| 41 | 0.0000E+00 | 1.4632E−02 | −9.6898E−02 |
| 42 | −6.5150E+00 | 4.5750E−02 | −4.9697E−02 |
| 61 | −1.5836E+00 | −3.5718E−02 | 1.3071E−02 |
| 62 | −7.4390E−01 | 8.6107E−02 | −3.2043E−02 |
| 71 | −5.6778E+01 | −4.2096E−03 | −7.9782E−05 |
| 72 | −5.7534E+00 | −2.2423E−02 | 6.6680E−03 |

TABLE 3

| Surface | C | D | E |
|---|---|---|---|
| 31 | 2.7485E−02 | −7.1420E−03 | −1.0796E−03 |
| 32 | 4.6967E−02 | −2.5107E−02 | 5.3830E−03 |
| 41 | 8.3077E−02 | −5.1178E−02 | 1.4209E−02 |
| 42 | 4.2463E−02 | −1.9040E−02 | 3.9984E−03 |
| 61 | −3.0925E−03 | 7.2884E−03 | −3.0424E−03 |
| 62 | 1.5377E−02 | −2.2310E−03 | 3.6928E−05 |
| 71 | 4.7358E−04 | −7.3375E−05 | 3.3776E−06 |
| 72 | −1.4231E−03 | 1.5283E−04 | −6.3432E−06 |

Figure 2:
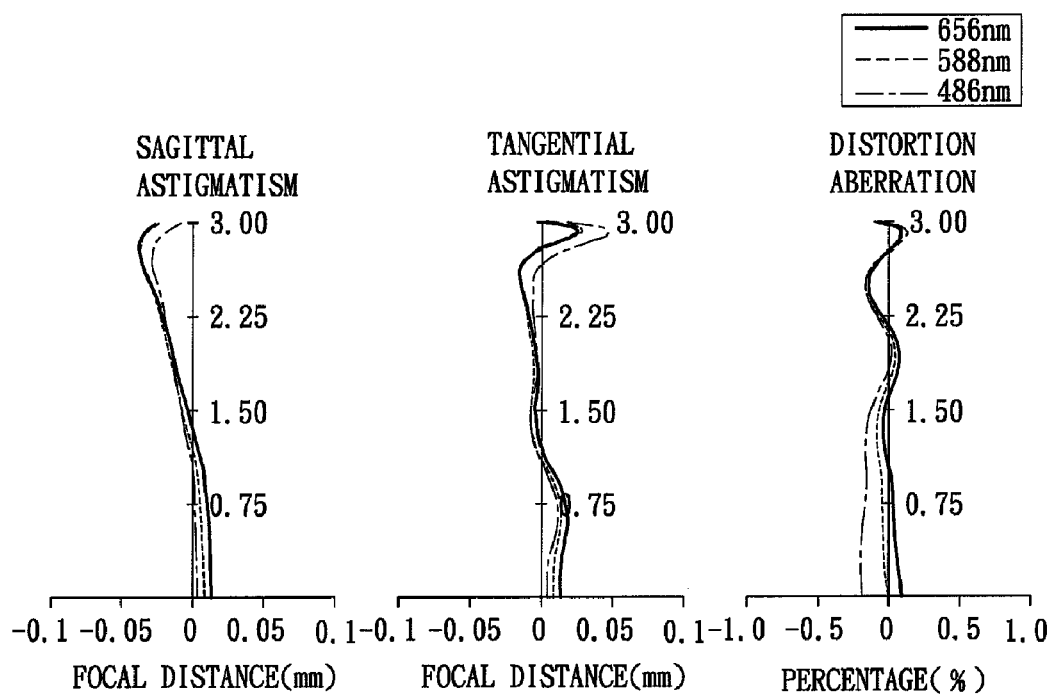
FIG. 2 illustrates plots of sagittal astigmatism, tangential astigmatism, and distortion aberrations of the imaging lens of the first preferred embodiment.

Shown in FIG. 2 from left to right are plots of sagittal astigmatism (along a sagittal plane with respect to the imaging plane 10), tangential astigmatism (along a tangential plane with respect to the imaging plane 10), and distortion aberrations of the imaging lens 2 of the first preferred embodiment at three representative wavelengths (656.2725 nm, 587.5618 nm, and 486.1327 nm). In the plots of sagittal and tangential astigmatisms, the imaging lens 2 has a range of focal distances not exceeding ±0.05 mm within the whole angle of view at each of the representative wavelengths. In contrast, the imaging lens disclosed in U.S. Pat. No. 7,480,105 has a range of focal distances not exceeding ±0.10 mm. Furthermore, in each of the plots of sagittal and tangential astigmatisms, curves that respectively represent the three representative wavelengths are relatively similar, which indicates that the imaging lens 2 of the first preferred embodiment has a relatively low chromatic aberration. Moreover, the distortion aberrations that occur in the imaging lens 2 of the first preferred embodiment have a range within ±0.5%, whereas those that occur in the imaging lens of U.S. Pat. No. 7,480,105 have a range within ±1.0%. Therefore, the imaging lens 2 of first the preferred embodiment of the present invention has significant improvement over the prior art in terms of distortion aberration.

Figure 3:
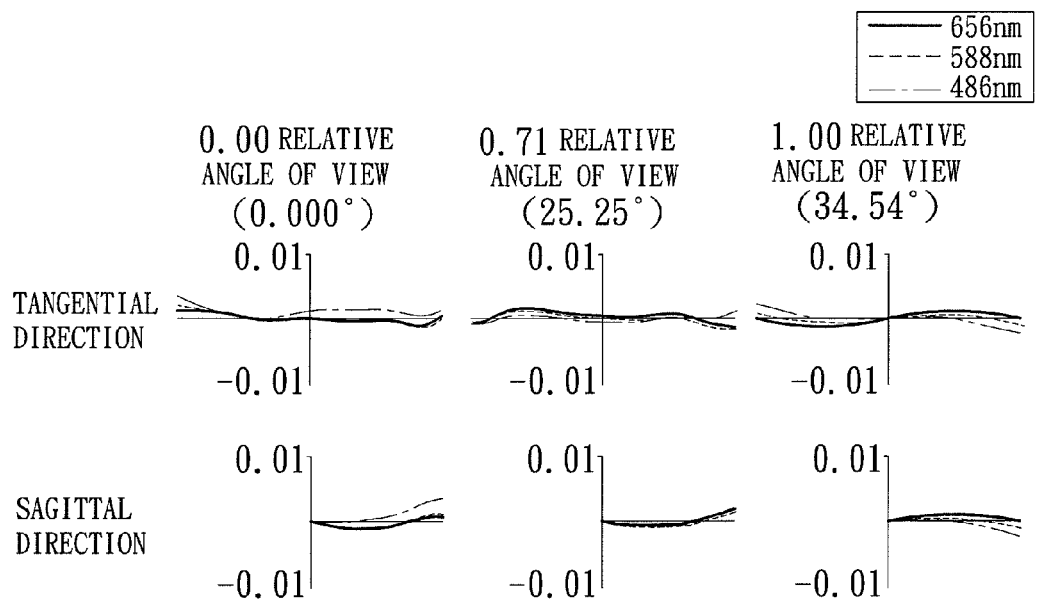
FIG. 3 illustrates ray fan plots of the imaging lens of the first preferred embodiment at different angles of view.

FIG. 3 illustrates ray fan plots of the imaging lens 2 of the first preferred embodiment at normalized half-angles of view of 1, 0.71, and 0, which correspond to relative angles of view of 34.54°, 25.25°, and 0°, respectively. It is apparent that the imaging lens 2 is able to achieve an angle of view of 69°, which is wider than those generally achievable by conventional imaging lens of the prior art (typically, 60° to 65°).

Figure 4:
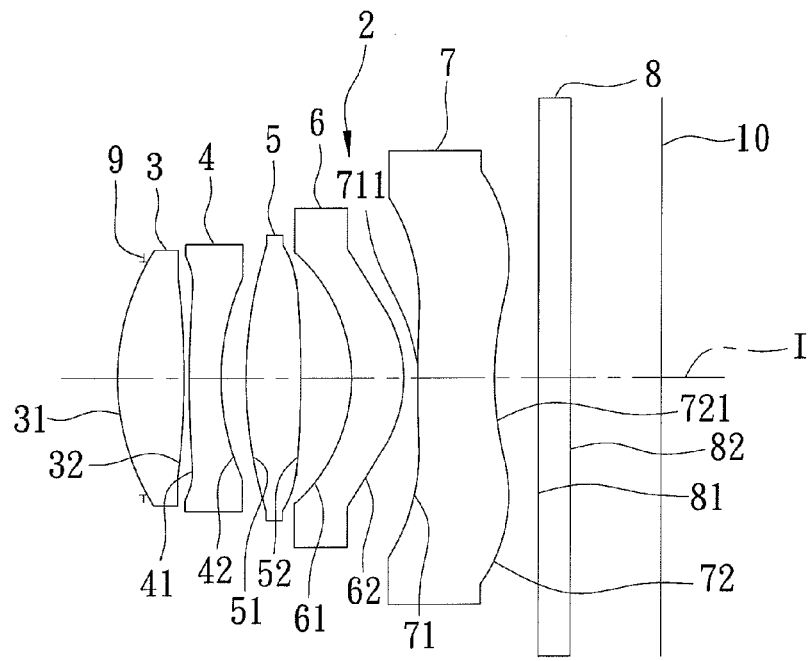
FIG. 4 is a schematic diagram illustrating the second preferred embodiment of an imaging lens according to the present invention.

Referring to FIG. 4, in the second preferred embodiment, the object-side surface 31 is a convex surface, the imaging-side surface 32 is a convex surface, the object-side surface 41 is a convex surface, the imaging-side surface 42 is a concave surface, the object-side surface 51 is a convex surface, the imaging-side surface 52 is a convex surface, the object-side surface 61 is a concave surface, the imaging-side surface 62 is a convex surface, the object-side surface 71 is a wavelike surface with a convex surface 711 in the vicinity of the optical axis (I), and the imaging-side surface 72 is a wavelike surface with a concave area 721 in the vicinity of the optical axis (I). It is to be noted that the second lens element 4 is a meniscus lens. The second and third lens elements 4, 5 have a gap formed therebetween. Table 4 shows optical parameters of the lens elements 3-7, the optical filter 8, and the imaging plane 10 in the second preferred embodiment.

TABLE 4

|  | Surface | Radius of curvature (mm) | Thickness (mm) | Refractive index | Abbe Number |
| --- | --- | --- | --- | --- | --- |
| Aperture Stop 9 | — | ∞ | 0.000 | — | — |
| First lens element 3 | 31 | 2.039 | 0.723 | 1.544 | 56.11 |
|  | 32 | −5.677 | 0.080 |  |  |
| Second lens element 4 | 41 | 14.715 | 0.308 | 1.607 | 26.65 |
|  | 42 | 1.902 | 0.296 |  |  |
| Third lens element 5 | 51 | 7.894 | 0.536 | 1.544 | 56.11 |
|  | 52 | −14.13 | 0.557 |  |  |
| Fourth lens element 6 | 61 | −1.432 | 0.575 | 1.544 | 56.11 |
|  | 62 | −1.057 | 0.135 |  |  |
| Fifth lens element 7 | 71 | 10.158 | 0.801 | 1.531 | 55.73 |
|  | 72 | 1.704 | 0.503 |  |  |

TABLE 4-continued

|  | Surface | Radius of curvature (mm) | Thickness (mm) | Refractive index | Abbe Number |
| --- | --- | --- | --- | --- | --- |
| Optical filter 8 | 81 | ∞ | 0.300 | 1.517 | 64.17 |
|  | 82 | ∞ | 0.958 |  |  |
| Imaging plane 10 | — | ∞ | 0.003 | — | — |

In the second preferred embodiment, the object-side surfaces 31, 41, 61, 71 and the imaging-side surfaces 32, 42, 52, 62, 72 are aspherical surfaces. Tables 5 and 6 show conic constants (K), and higher-order aspherical surface coefficients (A), (B), (C), (D), (E) of each of the object-side surfaces 31, 41, 61, 71 and the imaging-side surfaces 32, 42, 62, 72.

TABLE 5

| Surface | K | A | B |
| --- | --- | --- | --- |
| 31 | −8.4976 | 0.1205E+00 | −0.6486E−01 |
| 32 | 0.0000 | 0.1215E+00 | −0.1560E+00 |
| 41 | 0.0000 | 0.3700E−01 | −0.1280E+00 |
| 42 | −8.0111 | 0.5795E−01 | −0.7925E−01 |
| 52 | 0.0000 | 0.1506E−01 | −0.1615E−01 |
| 61 | −3.0476 | −0.3374E−01 | 0.4435E−02 |
| 62 | −0.6539 | 0.1530E+00 | −0.5477E−01 |
| 71 | −80.3952 | −0.5983E−01 | 0.8305E−02 |
| 72 | −10.4676 | −0.5597E−01 | 0.1444E−01 |

TABLE 6

| Surface | C | D | E |
| --- | --- | --- | --- |
| 31 | 0.2929E−01 | −0.1660E−02 | −0.5923E−02 |
| 32 | 0.9991E−01 | −0.4110E−01 | 0.2997E−02 |
| 41 | 0.9120E−01 | −0.4853E−01 | 0.1321E−01 |
| 42 | 0.6065E−01 | −0.3210E−01 | 0.8332E−02 |
| 52 | 0.0000E+00 | 0.0000E+00 | 0.0000E+00 |
| 61 | −0.1392E−01 | 0.4240E−02 | −0.2398E−02 |
| 62 | 0.2573E−01 | −0.2833E−02 | 0.7917E−03 |
| 71 | 0.7690E−03 | −0.6612E−03 | 0.1125E−03 |
| 72 | −0.3544E−02 | 0.4774E−03 | −0.2970E−04 |

Figure 5:
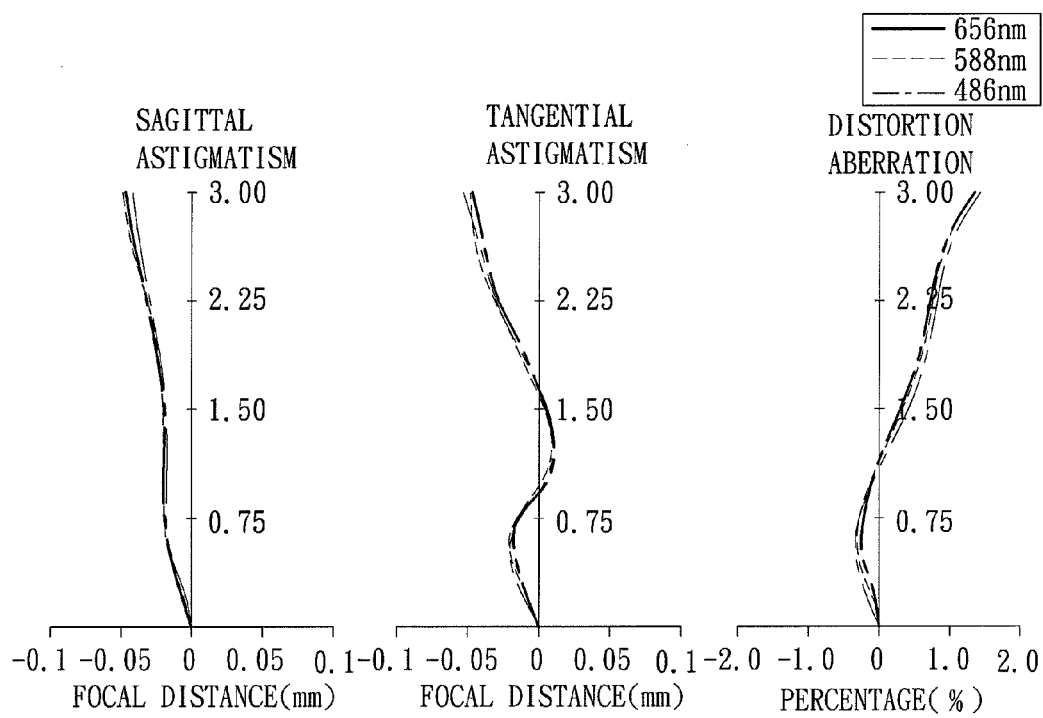
FIG. 5 illustrates plots of sagittal astigmatism, tangential astigmatism, and distortion aberrations of the imaging lens of the second preferred embodiment.
Figure 6:
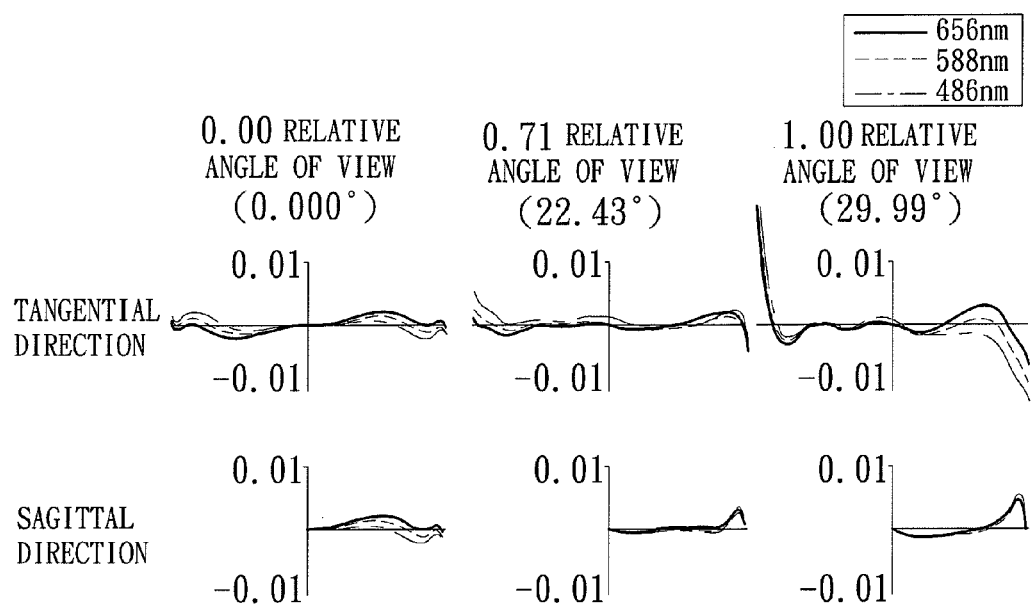
FIG. 6 illustrates ray fan plots of the imaging lens of the second preferred embodiment at different angles of view.

Shown in FIG. 5 from left to right are plots of sagittal astigmatism, tangential astigmatism, and distortion aberrations of the imaging lens 2 of the second preferred embodiment at the three representative wavelengths. It is apparent that the imaging lens 2 of the second preferred embodiment has a range of focal distances not exceeding ±0.05 mm within the whole angle of view at each of the representative wavelengths, and has a range of distortion aberrations not exceeding ±1.0%. Therefore, the imaging lens 2 of the second preferred embodiment has significant improvements over the prior art. Referring to FIG. 6, the imaging lens 2 of the second preferred embodiment is able to achieve a high imaging quality even at a relative angle of view of 29.99° (i.e., an angle of view of 59.98°).

Figure 7:
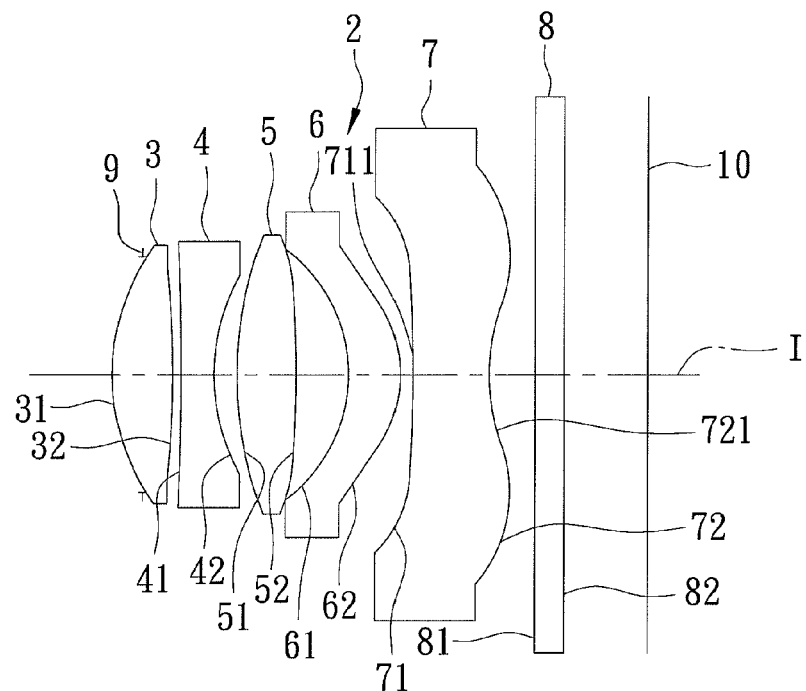
FIG. 7 is a schematic diagram illustrating the third preferred embodiment of an imaging lens according to the present invention.

Referring to FIG. 7, in the third preferred embodiment, the object-side surface 31 is a convex surface, the imaging-side surface 32 is a convex surface, the object-side surface 41 is a convex surface, the imaging-side surface 42 is a concave surface, the object-side surface 51 is a convex surface, the imaging-side surface 52 is a convex surface, the object-side surface 61 is a concave surface, the imaging-side surface 62 is a convex surface, the object-side surface 71 is a wavelike surface with a convex area 711 in the vicinity of the optical axis (I), and the imaging-side surface 72 is a wavelike surface with a concave area 721 in the vicinity of the optical axis (I). The second and third lens elements 4, 5 have a gap formed therebetween. Table 7 shows optical parameters of the lens elements 3-7, the optical filter 8, and the imaging plane 10 in the third preferred embodiment.

TABLE 7

| | Surface | Radius of curvature (mm) | Thickness (mm) | Refractive index | Abbe Number |
|---|---|---|---|---|---|
| Aperture Stop 9 | — | ∞ | 0.0000 | — | — |
| First lens element 3 | 31 | 2.156 | 0.698 | 1.544 | 56.11 |
| | 32 | −6.323 | 0.080 | | |
| Second lens element 4 | 41 | 10.163 | 0.343 | 1.607 | 26.65 |
| | 42 | 1.728 | 0.286 | | |
| Third lens element 5 | 51 | 4.347 | 0.600 | 1.544 | 56.11 |
| | 52 | −42.965 | 0.627 | | |
| Fourth lens element 6 | 61 | −1.369 | 0.573 | 1.544 | 56.11 |
| | 62 | −1.039 | 0.100 | | |
| Fifth lens element 7 | 71 | 8.102 | 0.888 | 1.531 | 55.73 |
| | 72 | 1.700 | 0.503 | | |
| Optical filter 8 | 81 | ∞ | 0.300 | | |
| | 82 | ∞ | 0.907 | 1.517 | 64.17 |
| Imaging plane 10 | — | ∞ | −0.006 | — | — |

In the third preferred embodiment, the object-side surfaces 31, 41, 61, 71 and the imaging-side surfaces 32, 42, 52, 62, 72 are aspherical surfaces. Tables 8 and 9 show conic constants (K), and higher-order aspherical surface coefficients (A), (B), (C), (D), (E) of each of the object-side surfaces 31, 41, 61, 71 and the imaging-side surfaces 32, 42, 52, 62, 72.

TABLE 8

| Surface | K | A | B |
|---|---|---|---|
| 31 | −9.3406 | 0.1169E+00 | −0.6931E−01 |
| 32 | 0.0000 | 0.1345E+00 | −0.1549E+00 |
| 41 | 0.0000 | 0.4691E−01 | −0.1196E+00 |
| 42 | −6.7131 | 0.6259E−01 | −0.6787E−01 |
| 52 | 0.0000 | 0.1405E−01 | −0.1734E−01 |
| 61 | −3.0315 | −0.4175E−01 | 0.2210E−02 |
| 62 | −0.6220 | 0.1505E+00 | −0.5707E−01 |
| 71 | −50.0136 | −0.5849E−01 | 0.8842E−02 |
| 72 | −10.1672 | −0.5278E−01 | 0.1407E−01 |

TABLE 9

| Surface | C | D | E |
|---|---|---|---|
| 31 | 0.4576E−01 | −0.1744E−01 | 0.1120E−02 |
| 32 | 0.1026E+00 | −0.4471E−01 | 0.5401E−02 |
| 41 | 0.8286E−01 | −0.4928E−01 | 0.1399E−01 |
| 42 | 0.4985E−01 | −0.3218E−01 | 0.1070E−01 |
| 52 | 0.0000E+00 | 0.0000E+00 | 0.0000E+00 |
| 61 | −0.8729E−02 | 0.5905E−02 | −0.1939E−02 |
| 62 | 0.2952E−01 | −0.1560E−02 | 0.1657E−03 |
| 71 | 0.8262E−03 | −0.6171E−03 | 0.5172E−04 |
| 72 | −0.3505E−02 | 0.4953E−03 | −0.3297E−04 |

Figure 8:
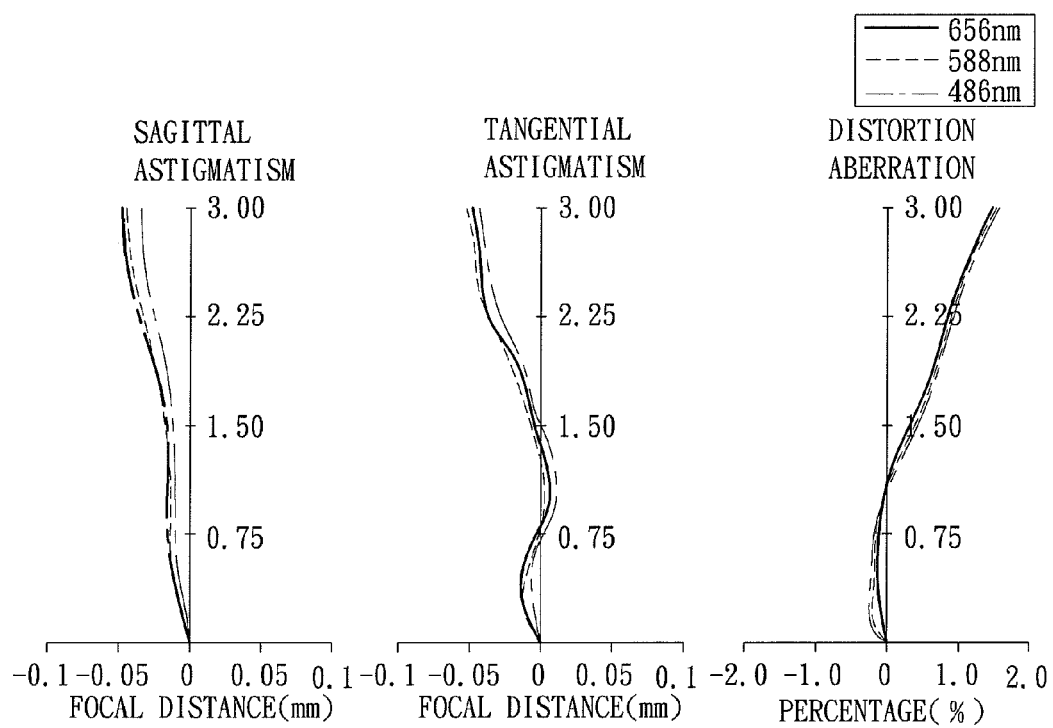
FIG. 8 illustrates plots of sagittal astigmatism, tangential astigmatism, and distortion aberrations of the imaging lens of the third preferred embodiment.
Figure 9:
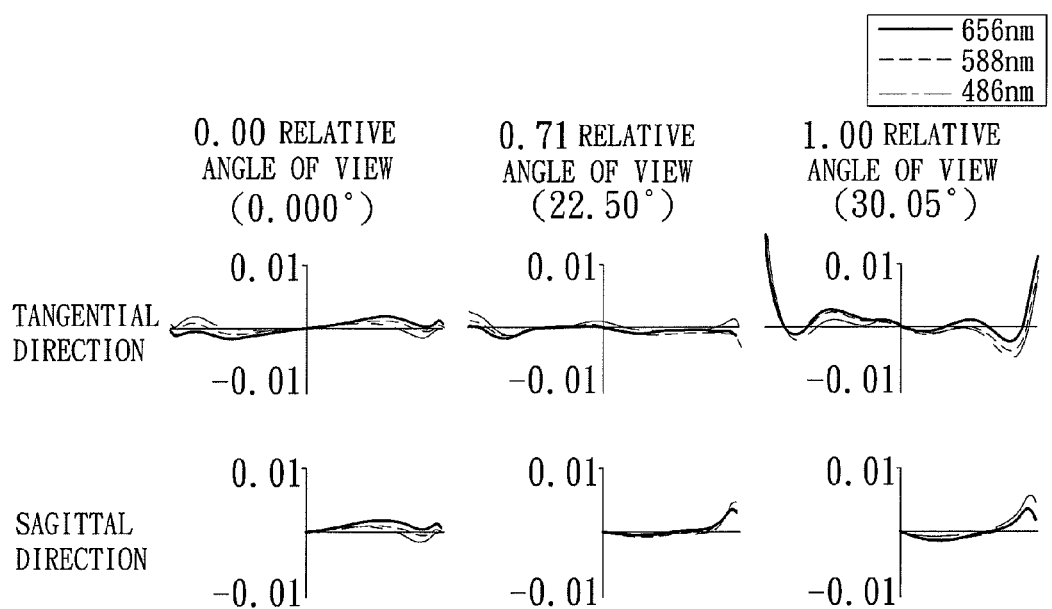
FIG. 9 illustrates ray fan plots of the imaging lens of the third preferred embodiment at different angles of view.

Shown in FIG. 8 from left to right are plots of sagittal astigmatism, tangential astigmatism, and distortion aberrations of the imaging lens 2 of the third preferred embodiment at the three representative wavelengths. Referring to FIG. 9, the imaging lens 2 of the third preferred embodiment is able to achieve a high imaging quality even at a relative angle of view of 30.05° (i.e., an angle of view of 60.1°).

Figure 10:
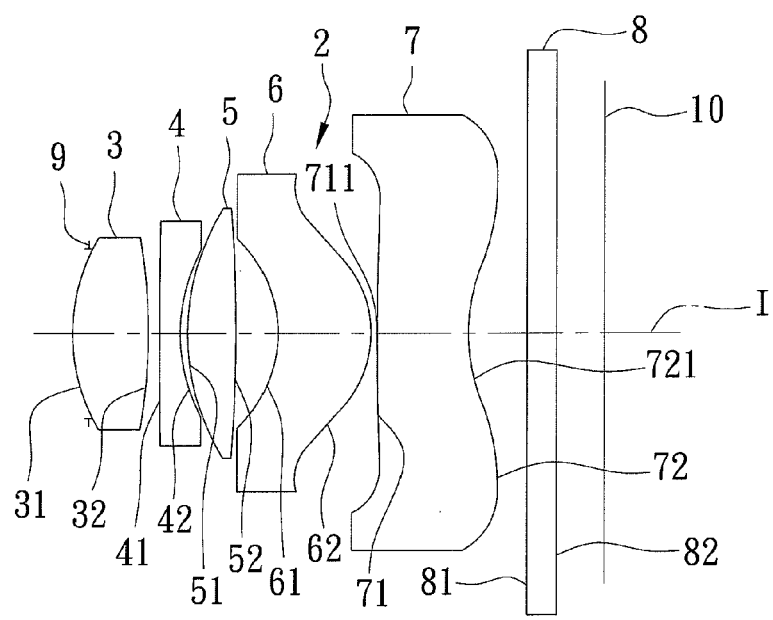
FIG. 10 is a schematic diagram illustrating the fourth preferred embodiment of an imaging lens according to the present invention.

Referring to FIG. 10, in the fourth preferred embodiment, the object-side surface 31 is a convex surface, the imaging-side surface 32 is a convex surface, the object-side surface 41 is a convex surface, the imaging-side surface 42 is a concave surface, the object-side surface 51 is a convex surface, the imaging-side surface 52 is a convex surface, the object-side surface 61 is a concave surface, the imaging-side surface 62 is a convex surface, the object-side surface 71 is a wavelike surface with a convex area 711 in the vicinity of the optical axis (I), and the imaging-side surface 72 is a wavelike surface with a concave area 721 in the vicinity of the optical axis (I). It is to be noted that, in the fourth preferred embodiment, the second and third lens elements 4, 5 have a gap of 0.08 mm formed therebetween. The second and third lens elements 4, 5 have a gap formed therebetween. Table 10 shows optical parameters of the lens elements 3-7, the optical filter 8, and the imaging plane 10 in the fourth preferred embodiment.

TABLE 10

| | Surface | Radius of curvature (mm) | Thickness (mm) | Refractive index | Abbe Number |
|---|---|---|---|---|---|
| Aperture 9 | — | ∞ | −0.232 | — | — |
| First lens element 3 | 31 | 2.219 | 0.820 | 1.544 | 56.09 |
| | 32 | −23.770 | 0.157 | | |
| Second lens element 4 | 41 | 10.272 | 0.200 | 1.607 | 27.00 |
| | 42 | 2.041 | 0.080 | | |
| Third lens element 5 | 51 | 3.107 | 0.536 | 1.544 | 56.09 |
| | 52 | −28.532 | 0.460 | | |
| Fourth lens element 6 | 61 | −1.573 | 1.000 | 1.544 | 56.09 |
| | 62 | −1.110 | 0.080 | | |
| Fifth lens element 7 | 71 | 6.250 | 1.000 | 1.530 | 56.00 |
| | 72 | 1.446 | 0.643 | | |
| Optical filter 8 | 81 | ∞ | 0.321 | 1.517 | 64.00 |
| | 82 | ∞ | 0.544 | | |
| Imaging plane 10 | — | ∞ | −0.010 | — | — |

In the fourth preferred embodiment, the object-side surfaces 31, 41, 61, 71 and the imaging-side surfaces 32, 42, 62, 72 are aspherical surfaces. Tables 11 and 12 show conic constants (K), and higher-order aspherical surface coefficients (A), (B), (C), (D), (E) of each of the object-side surfaces 31, 41, 61, 71 and the imaging-side surfaces 32, 42, 62, 72.

TABLE 11

| Surface | K | A | B |
|---|---|---|---|
| 31 | −8.5187E+00 | 9.3882E−02 | −5.7214E−02 |
| 32 | 1.4463E+02 | 3.6585E−02 | −7.8505E−02 |
| 41 | 0.0000E+00 | 8.0940E−03 | −9.7919E−02 |
| 42 | −5.3102E+00 | 4.2399E−02 | −5.0677E−02 |
| 61 | −1.3816E+00 | −4.2482E−02 | 1.0612E−02 |
| 62 | −7.5928E−01 | 8.3906E−02 | −2.9373E−02 |
| 71 | −1.3236E+02 | −9.8780E−03 | 1.8063E−04 |
| 72 | −7.1273E+00 | −3.2144E−02 | 7.6997E−03 |

TABLE 12

| Surface | C | D | E |
|---|---|---|---|
| 31 | 2.7996E−02 | −7.0996E−03 | −2.6778E−03 |
| 32 | 4.4954E−02 | −2.6116E−02 | 5.7804E−03 |
| 41 | 8.4141E−02 | −4.9760E−02 | 1.4614E−02 |
| 42 | 4.4029E−02 | −1.8215E−02 | 3.9823E−03 |
| 61 | −1.1601E−03 | 8.3200E−03 | −3.1967E−03 |
| 62 | 1.6406E−02 | −2.0281E−03 | 2.9374E−05 |
| 71 | 3.3898E−04 | −1.3394E−04 | −8.1716E−06 |
| 72 | −1.4798E−03 | 1.3662E−04 | −6.9898E−06 |

Figure 11:
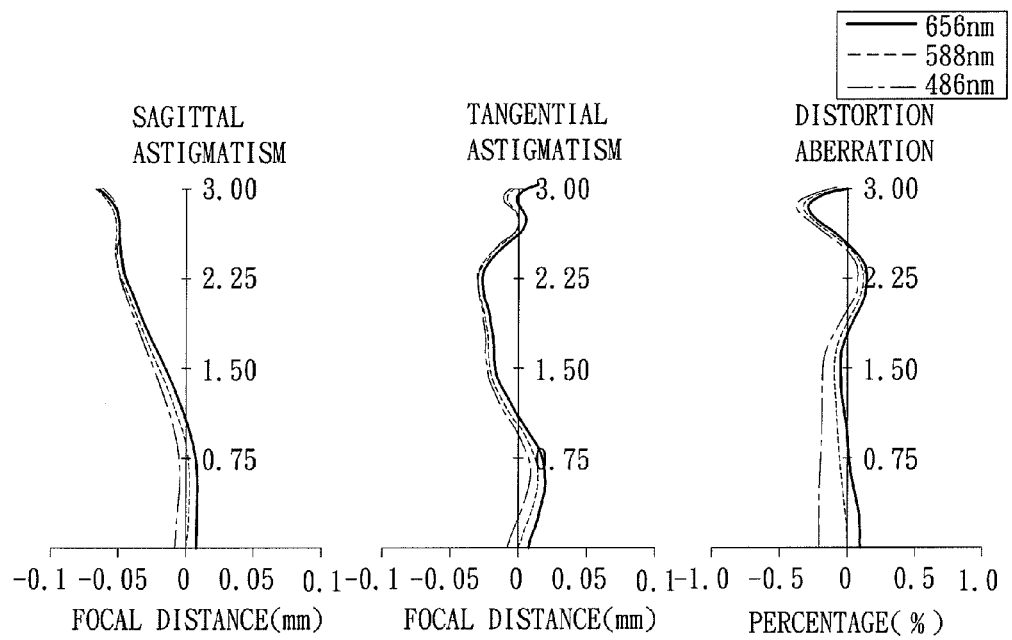
FIG. 11 illustrates plots of sagittal astigmatism, tangential astigmatism, and distortion aberrations of the imaging lens of the fourth preferred embodiment.
Figure 12:
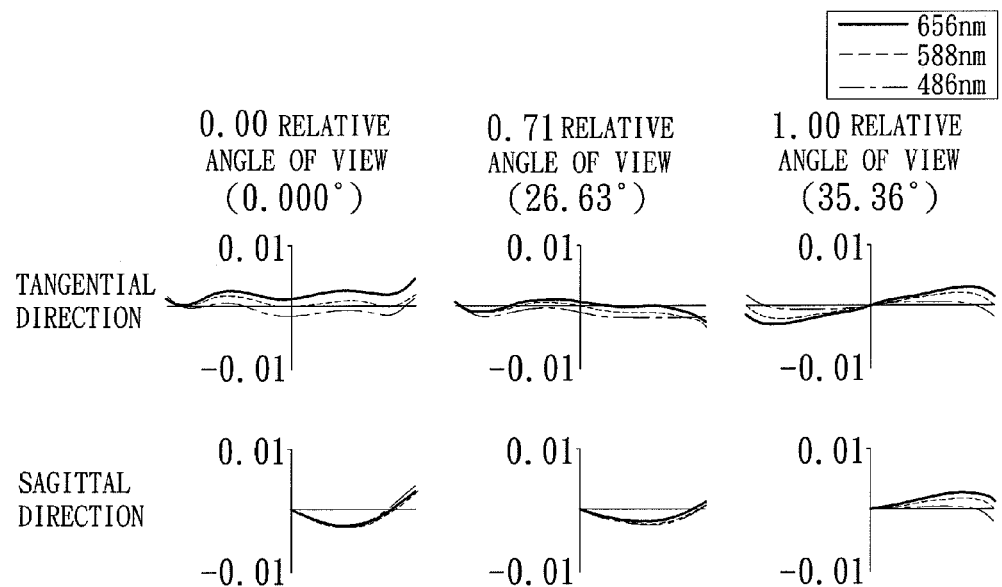
FIG. 12 illustrates ray fan plots of the imaging lens of the fourth preferred embodiment at different angles of view.

Shown in FIG. 11 from left to right are plots of sagittal astigmatism, tangential astigmatism, and distortion aberrations of the imaging lens 2 of the fourth preferred embodiment at the three representative wavelengths. Referring to FIG. 12, the imaging lens 2 of the fourth preferred embodiment is able to achieve a high imaging quality at a relative angle of 35.36° (i.e., an angle of view of 71°).

Table 13 shows optical parameters of the preferred embodiments for comparison.

TABLE 13

| | Imaging Height = 3.0 mm | | | |
|---|---|---|---|---|
| Preferred Embodiment | 1 | 2 | 3 | 4 |
| F Number | 2.6 | 2.4 | 2.4 | 2.6 |
| Half-angle of view | 34.5 | 30.0 | 30.0 | 35.4 |
| f | 4.353 | 4.816 | 4.818 | 4.217 |
| TL | 6.001 | 5.772 | 5.913 | 5.600 |
| f1 | 3.224 | 2.842 | 3.033 | 3.760 |
| f2 | −3.534 | −3.605 | −3.459 | −4.205 |
| F3 | 4.577 | 9.357 | 7.264 | 5.163 |
| F4 | 4.951 | 4.791 | 4.889 | 3.916 |
| F5 | −3.780 | −3.973 | −4.243 | −3.805 |
| F12 | 9.393 | 7.210 | 9.421 | 12.650 |
| Angle of chief ray | 26.0 | 26.0 | 25.0 | 26.3 |
| \|f2/f1\| | 1.096 | 1.269 | 1.140 | 1.118 |
| \|f4/f5\| | 1.310 | 1.206 | 1.152 | 1.029 |
| \|f12/f\| | 2.158 | 1.497 | 1.955 | 3.000 |
| TL/f | 1.379 | 1.199 | 1.227 | 1.328 |
| f1/f | 0.741 | 0.590 | 0.629 | 0.892 |
| F3/f | 1.052 | 1.943 | 1.508 | 1.224 |
| \|f2/f\| | 0.811 | 0.749 | 0.718 | 0.997 |

The imaging lens 2 of each of the preferred embodiments satisfies optical conditions 2 to 10, which are described hereinafter.

Optical condition 2:

$$|f_2/f|<1 \tag{2}$$

wherein $f_2$ represents a focal length of the second lens element 4. The imaging lens 2 must satisfy optical condition 2 such that the second lens element 4 may have a range of focal lengths (i.e., a range of negative focusing powers) for effectively reducing the effect of a combined positive focusing power of the first and third lens elements 3, 5. Otherwise, the imaging lens 2 may have relatively short overall focal lengths and poor aberration performances even in the presence of compensation by the fourth and fifth lens elements 6, 7. It is worth noting that, in the first, second, and third preferred embodiments, the imaging lens 2 preferably satisfies the optical condition of $|f_2/f|<0.85$ in order to provide a better imaging quality.

$$f_3>f>0.85 \tag{3}$$

wherein $f_3$ represents a focal length of the third lens element 5, and f represents a focal length of the imaging lens 2. Optical condition 3 is critical for ensuring that the focal distance of the third lens element 5 is long enough to thereby reduce the effect of off-axis aberrations.

Optical conditions 3 to 6:

$$|f_2/f_1|>1 \tag{4}$$

$$0.8<|f_4/f_5|<1.6 \tag{5}$$

$$v_{d1}>50 \tag{6}$$

$$v_{d2}>30 \tag{7}$$

wherein $f_1$, $f_4$, and $f_5$ represent focal lengths of the first, fourth, and fifth lens elements 3, 6, 7, respectively, and $v_{d1}$ and $v_{d2}$ are Abbe numbers of the first and second lens elements 3, 4, respectively.

Optical condition 4 is critical for ensuring that the positive focusing power of the first lens element 3 has a significant effect upon an overall positive focusing power of the imaging lens 2 relative to the negative focusing power of the second lens element 4, which reduces an overall focal length of the imaging lens 2 to favor size reduction of electronic devices.

It is worth noting that the fourth and fifth lens elements 6, 7 provide dispersion correction instead of focal distance adjustment, and hence have relatively low ratios of focal distance ranging from 0.8 to 1.6.

Moreover, optical conditions 6 and 7 are critical for reducing chromatic aberration. It is worth noting that the high Abbe number of the first lens element 3 enables the first lens element 3 to exhibit low chromatic aberration even in the presence of the high positive focusing power thereof.

Optical conditions 8 and 9:

$$0.9<|f_{12}/f|<3.1 \tag{8}$$

$$TL/f<1.55 \tag{9}$$

wherein $f_{12}$ represents a combined focal length of the first and second lens elements 3, 4, and TL represents a distance between the object-side surface 31 of the first lens element 3 and the imaging plane 10. Optical condition 8 is critical for reducing an overall length (i.e., $f_{12}/f<3.1$) and reducing higher-level aberrations (i.e., $0.9<f_{12}/f$) of the imaging lens 2. Optical condition 9 is also critical for reducing the overall length.

Optical condition 10:

$$0.5<f_1/f<1.0 \tag{10}$$

Optical condition 10 is critical for reducing the overall length (i.e., $f_1/f<1.4$) and reducing aberrations (i.e., $0.5<f_1/f$) of the imaging lens 2.

Figure 13:
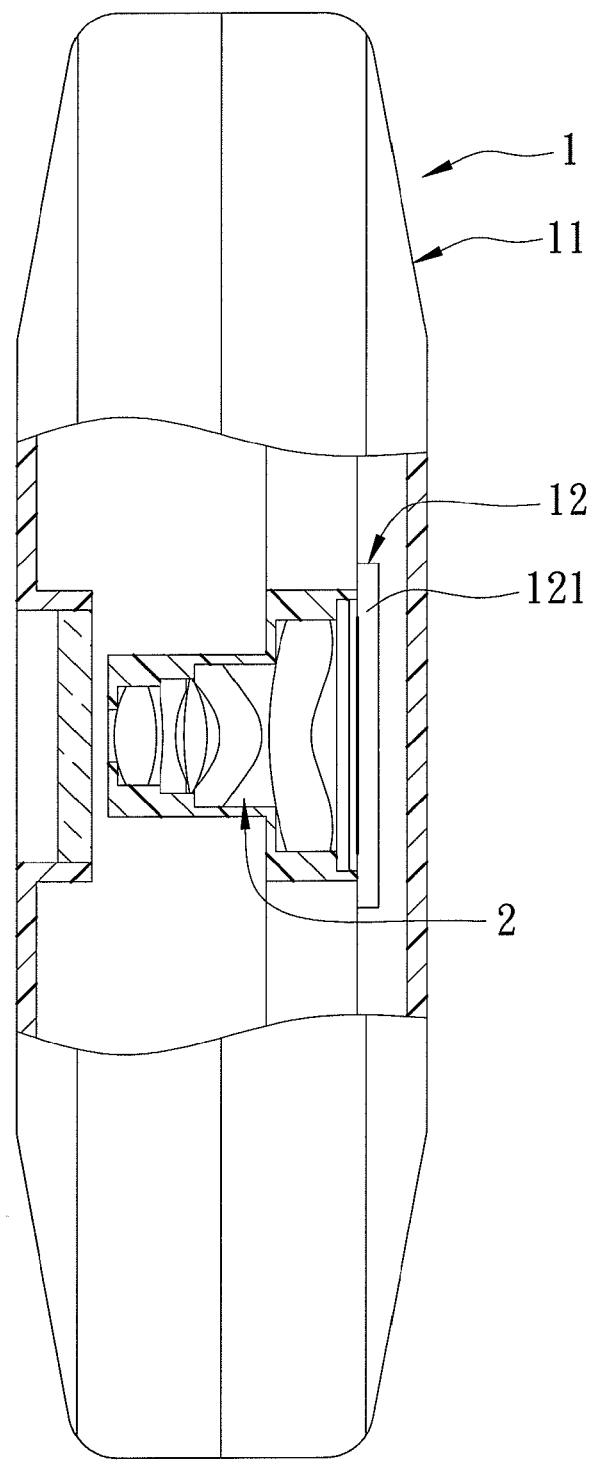
FIG. 13 is a schematic partly sectional view illustrating the preferred embodiment of an electronic apparatus, which includes a housing and an imaging module, according to the present invention.

Referring to FIG. 13, the preferred embodiment of an electronic apparatus 1 according to this invention includes a housing 11 and an imaging module 12 disposed in the housing 11. In this embodiment, the electronic apparatus 1 is exemplified as a mobile phone. However, in other embodiments, the electronic apparatus 1 may be implemented otherwise. The imaging module 12 includes the imaging lens 2 of the first preferred embodiment, and an image sensor 3 disposed at the imaging plane 10.

In summary, the imaging lenses 2 of the preferred embodiments have relatively low vignetting, sagittal and tangential astigmatisms, distortion aberrations, and chromatic aberrations, are operable at an F number lower than 3, and have a relatively wide angle of view. Furthermore, the first, second, third, fourth, and fifth lens elements 3-7 are made of plastic and hence have low weights and may be fabricated at lower costs.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An imaging lens comprising first, second, third, fourth, and fifth lens elements arranged in the given order from an object side to an imaging side, each of said first, second, third, fourth and fifth lens elements having an object-side surface facing toward the object side, and an imaging-side surface facing toward the imaging side, wherein:

said first lens element has a positive focusing power, and said object-side surface of said first lens element is a convex surface;

said second lens element has a negative focusing power, and said imaging-side surface of said second lens element is a concave surface;

said third lens element has a positive focusing power, and each of said imaging-side and object-side surfaces of said third lens element is a convex surface;

said fourth lens element is a meniscus lens, and said imaging-side surface of said fourth lens element is a convex surface;

said imaging-side surface of said fifth lens element has a concave area in a vicinity of an optical axis of said fifth lens element;

each of said first, second, third, fourth and fifth lens elements is made of plastic; and said imaging lens satisfies the optical conditions of $|f_2/f|<1$ $f_3/f>0.85$ wherein $f_2$ represents a focal length of said second lens element, $f_3$ represents a focal length of said third lens element, and f represents a focal length of said imaging lens.

2. The imaging lens as claimed in claim 1, wherein said imaging system further satisfies the optical condition of $|f_2/f|<0.85$.

3. The imaging lens as claimed in claim 2, wherein said second and third lens elements have a gap formed therebetween.

4. The imaging lens as claimed in claim 1, wherein said fourth lens element has a positive focusing power, and said fifth lens element has a negative focusing power.

5. The imaging lens as claimed in claim 4, wherein said imaging-side surface of said fifth lens element is a wavelike surface.

6. The imaging lens as claimed in claim 5, wherein said imaging lens further satisfies the optical conditions of:

$|f_2/f_1|>1$ $0.8<|f_4/f_5|<1.6$ $v_{d1}>50$ $v_{d2}>30$ wherein $f_1$, $f_4$, and $f_5$ represent focal lengths of said first, fourth, and fifth lens elements, respectively, and $v_{d1}$ and $v_{d2}$ are Abbe numbers of said first and second lens elements, respectively.

7. The imaging lens as claimed in claim 6, further comprising an imaging plane disposed at the imaging side, wherein said imaging lens further satisfies the optical conditions of:

$0.9<|f_{12}/f|<3.1$ $TL/f<1.55$ wherein $f_{12}$ represents a combined focal length of said first and second lens elements, and TL represents a distance between said object-side surface of said first lens element and said imaging plane.

8. The imaging lens as claimed in claim 7, wherein said imaging lens further satisfies the optical condition of $0.5<f_1/f<1.0$.

9. An electronic apparatus comprising:

a housing; and an imaging module disposed in said housing, said imaging module including an imaging lens having an object side and an imaging side, and an image sensor disposed at said imaging side;

said imaging lens including first, second, third, fourth, and fifth lens elements arranged in the given order from said object side to said imaging side, each of said first, second, third, fourth and fifth lens elements having an object-side surface facing toward said object side, and an imaging-side surface facing toward said imaging side, wherein:

said first lens element has a positive focusing power, and said object-side surface of said first lens element is a convex surface;

said second lens element has a negative focusing power, and said imaging-side surface of said second lens element is a concave surface;

said third lens element has a positive focusing power, and each of said imaging-side and object-side surfaces of said third lens element is a convex surface;

said fourth lens element is a meniscus lens, and said imaging-side surface of said fourth lens element is a convex surface;

said imaging-side surface of said fifth lens element has a concave area in a vicinity of an optical axis of fifth lens element;

each of said first, second, third, fourth and fifth lens elements is made of plastic; and said imaging lens satisfies the optical conditions of $|f_2/f|<1$ $f_3/f>0.85$ wherein $f_2$ represents a focal length of said second lens element, $f_3$ represents a focal length of said third lens element, and f represents a focal length of said imaging lens.

* * * * *